United States Patent
Tsai et al.

(10) Patent No.: US 8,407,770 B2
(45) Date of Patent: Mar. 26, 2013

(54) SYSTEM AND METHOD FOR MANAGING USER TOKEN IN CLIENT DEVICE ON NETWORK

(75) Inventors: Teng-Yu Tsai, New Taipei (TW); Jing-Lin Wu, New Taipei (TW); Ting-Chieh Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 55 days.

(21) Appl. No.: 13/176,374

(22) Filed: Jul. 5, 2011

(65) Prior Publication Data
US 2012/0079572 A1 Mar. 29, 2012

(30) Foreign Application Priority Data
Sep. 29, 2010 (TW) .............................. 99133160 A

(51) Int. Cl.
*H04L 9/32* (2006.01)
(52) U.S. Cl. ........................................... 726/6; 707/769
(58) Field of Classification Search ....... 726/6; 707/769
See application file for complete search history.

(56) References Cited

U.S. PATENT DOCUMENTS 8,112,437 B1 * 2/2012 Katragadda et al. .......... 707/769
2009/0328167 A1 * 12/2009 O'Mahony ....................... 726/6

* cited by examiner

*Primary Examiner* — Nathan Flynn
*Assistant Examiner* — Phuoc Tran
(74) *Attorney, Agent, or Firm* — Altis Law Group, Inc.

(57) ABSTRACT

A user token management system in a client device on a network comprises an obtaining module, a web controller and a processing module. The obtaining module obtains a user token from a database in response to a retrieving request for retrieving authorization of a web service provider on the network. The web controller transmits an authenticating request for authenticating the user token to the web service provider and receives an authentication result authenticating the user token. The processing module deletes the user token from the database when that user token is not authenticated by the web service provider.

20 Claims, 4 Drawing Sheets

SYSTEM AND METHOD FOR MANAGING USER TOKEN IN CLIENT DEVICE ON NETWORK

BACKGROUND

1. Technical Field

The disclosure generally relates to a system and method for managing user token in a client device on a network.

2. Description of Related Art

A user token is generated by a web service provider, such as a social networking service (SNS) site, to verify whether a user is authorized to access a service provided by the web service provider. In a conventional manner, a client device stores the user token in a cookie in a local memory area of the client device. When the cache of cookies is cleaned up or deleted however, the user token will be lost.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming languages such as Java, C, or Assembly. One or more software instructions in the modules may be embedded in firmware, such as an EPROM. It is noteworthy, that modules may comprise connected logic units, such as gates and flip-flops, and programmable units such as programmable gate arrays or processors. The modules described herein may be implemented as software and/or hardware modules and may be stored in any type of computer-readable medium or other computer storage device.

Figure 1:
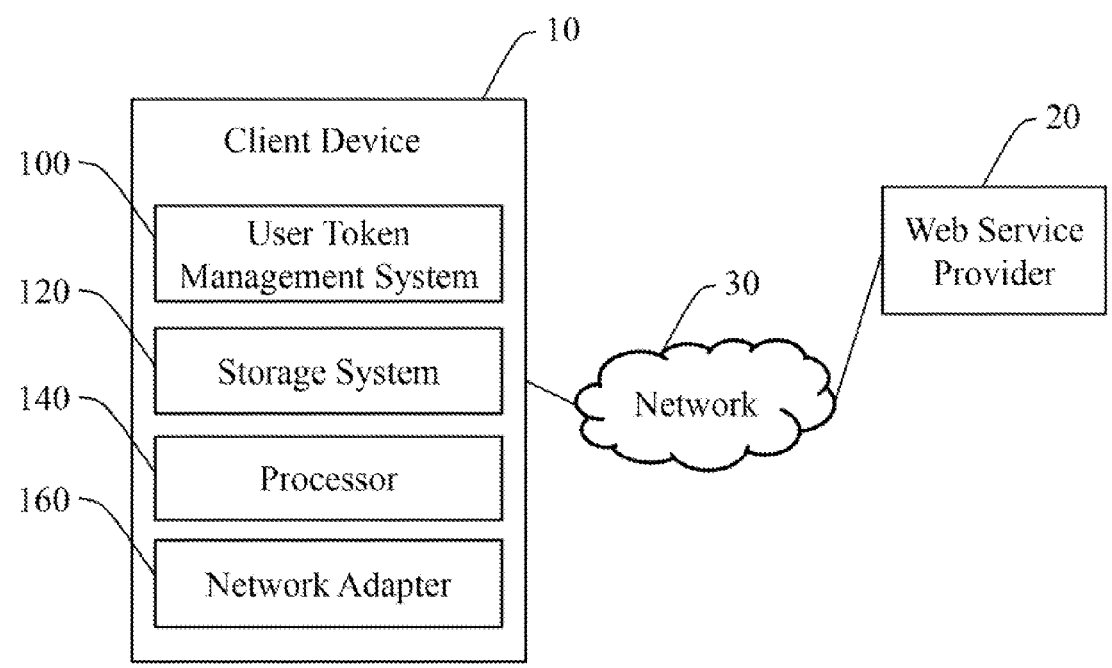
FIG. 1 is a schematic diagram of one embodiment of a user token management system installed in a client device.

FIG. 1 is a schematic diagram of one embodiment of a client device 10 including a user token management system 100, a storage system 120, at least one processor 140, and a network adapter 160. The functions of the user token management system 100 are implemented by the client device 10. The user token management system 100 can communicate with a web service provider 20 via a network 30 and manage a plurality of user tokens associated with at least one web service provider 20. The client device 10 may be a desktop computer, a flat panel computer, a PDA or a smart phone.

In one embodiment, the storage system 120 may be a magnetic or an optical storage system, such as a hard disk drive, an optical drive, or a tape drive. The network adapter 160 may be a network interface card using a specific physical layer and data link layer standard such Ethernet or Wi-Fi. The network 30 may be a local area network (LAN) or a wide area network (WAN), such as Internet.

Figure 2:
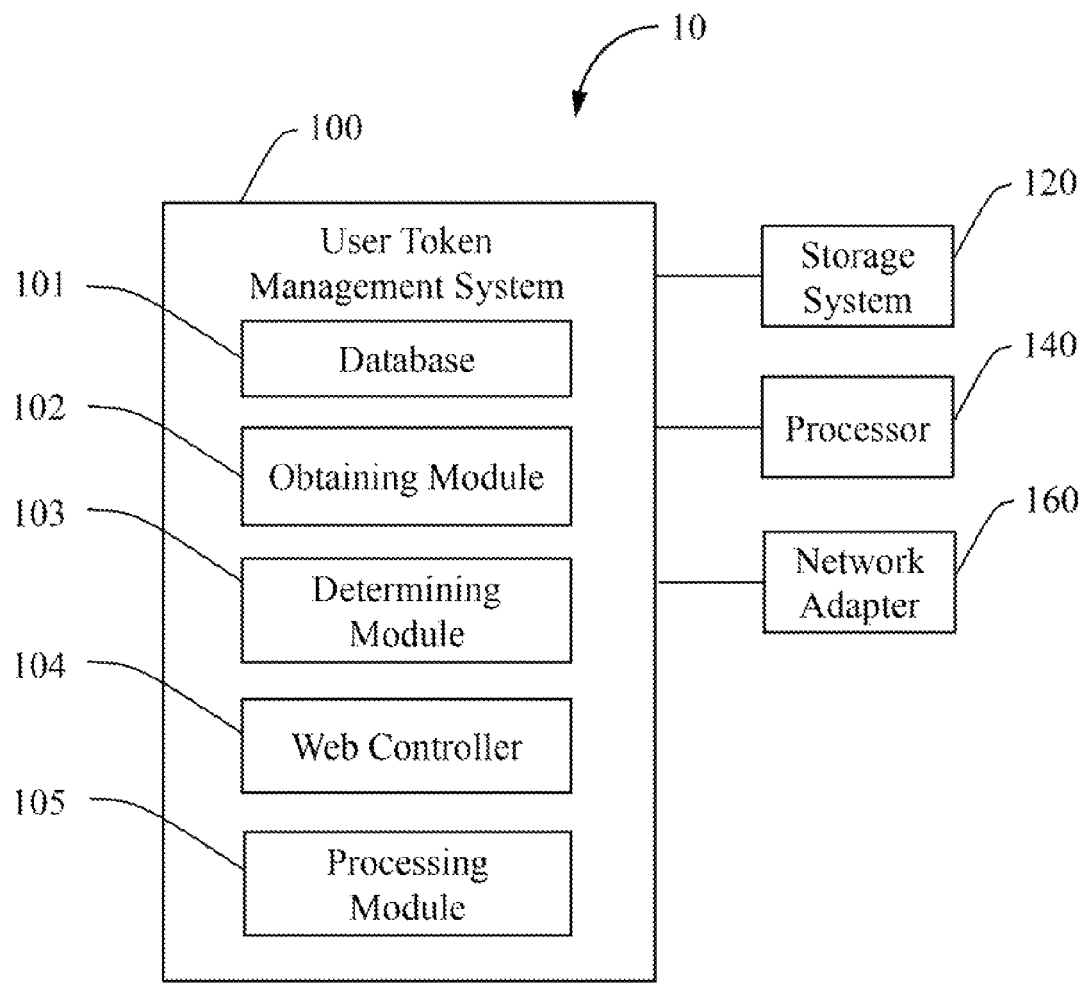
FIG. 2 is a schematic diagram of one embodiment of function modules of the user token management system of FIG. 1.

FIG. 2 is a schematic diagram of one embodiment of function modules of the user token management system 100. In the embodiment, the user token management system 100 includes a database 101, an obtaining module 102, a determining module 103, a web controller 104, and a processing module 105. Each of the modules 101-105 may be a software program including one or more computerized instructions that are stored in the storage system 120 and executed by the processor 140.

The database 101 is operable to store at least one user token associated with at least one web service provider 20. The database 101 may be a MySQL server database or an XML file. In one embodiment, a user token is associated with an expiration time that indicates when a user token will expire. The database 101 is also operable to store an expiration time in relation to each user token.

The obtaining module 102 may obtain a user token from the database 101 in response to a retrieving request for retrieving authorization of a web service provider 20 on the network 30. For example, when a user wants to access a SNS, such as FACEBOOK®, a retrieving request for retrieving authorization of the SNS is generated. In response to the request, the obtaining module 102 may query and obtain a user token associated with that SNS from the database 101. If there is more than one user token associated with that SNS, the obtaining module 102 may be directed by the user to select a particular one of them.

The determining module 103 may determine whether the user token has expired according to the expiration time of the user token, and it may delete the user token from the database when the user token has expired. The determining module 103 may read the current time from a local clock in the client device 10 or a clock on Internet. If the current time is later than the expiration time of a user token, the determining module 103 determines that this user token has expired and deletes this user token from the database 101.

The web controller 104 may transmit an authenticating request for authenticating the user token to the web service provider 20 and receive an authentication result authenticating the user token from the web service provider 20. When the user token is not authenticated, the processing module 105 may delete the user token from the database. When the user token is authenticated, the processing module 105 may display a login successful indication to inform that the user is authorized to access to the web service.

The web controller 104 may invoke a web browser and instruct the web browser to perform a plurality of operations.

The web controller 104 may instruct the web browser to transmit a request to the web service provider 20, for a page for input user-unique information. The user-unique information may include a user name and a password of a user, and a login page is commonly offered by the web service provider 20 as the medium for taking the user's unique information. The web browser receives the login page and displays it to a user. The user inputs his or her unique information, such as a user name and a password, on the login page. The web browser transmits the user-unique information to the web service provider 20 and in return receives a user token associated with that user-unique information. The web browser may store the user token in a memory area of the storage system 120. The memory area may comprise a cookie.

The web controller 104 may extract the user token from the memory area and store the user token in the database 101.

Figure 3:
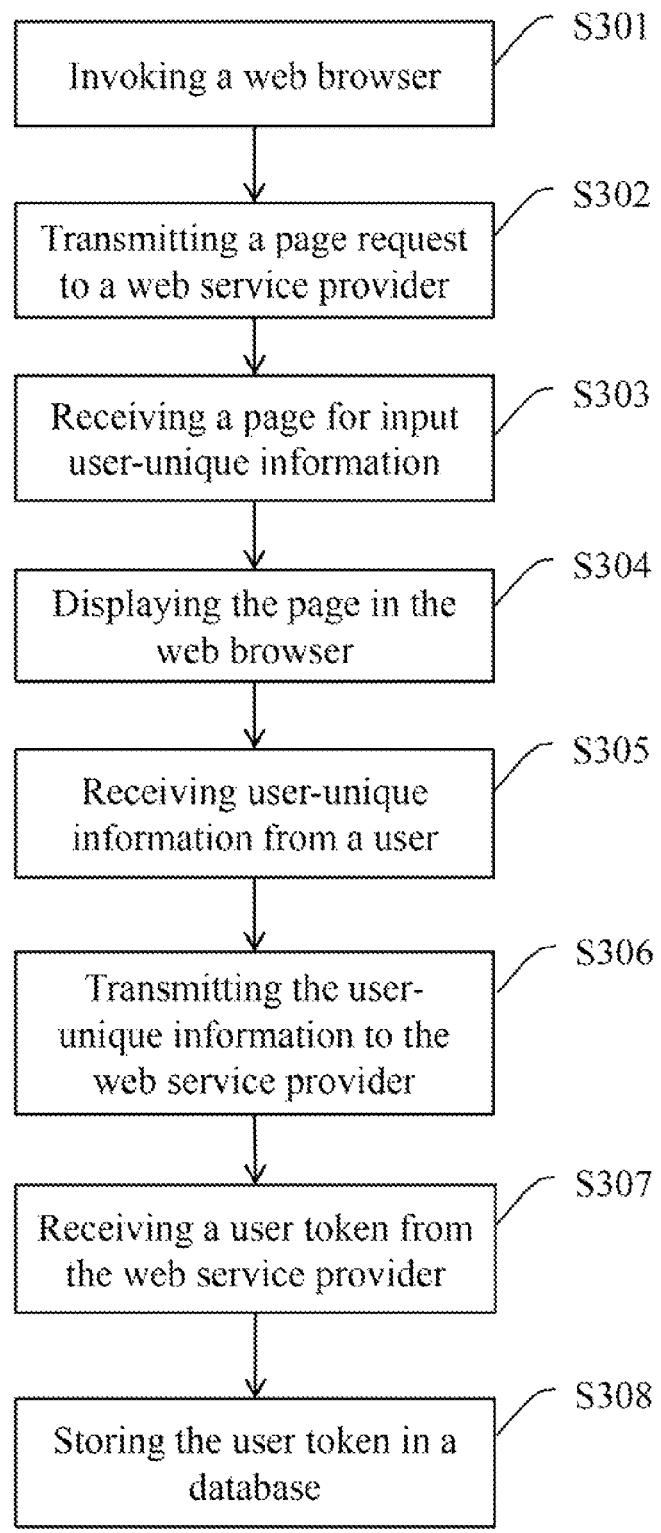
FIG. 3 is an operational flow diagram representing an exemplary embodiment of a method for storing a user token in a database using the use token management system of FIG. 1.

FIG. 3 is a flowchart illustrating one embodiment of a method of storing a user token in a database. The method may include the following blocks.

In block S301, the web controller 104 invokes a web browser.

In block S302, the web controller 104 instructs the web browser to transmit a request to the web service provider 20, for a page for input user-unique information.

In block S303, the web browser receives the requested page from the web service provider 20.

In block S304, the web browser displays the page for input user-unique information.

In block S305, the web browser receives user-unique information input by a user.

In block S306, the web browser transmits the user-unique information to the web service provider 20.

In block S307, the web browser receives, from the web service provider 20, a user token associated with the user-unique information and stores the user token in a memory area of the storage system 120. The memory area may comprise a cookie.

In block S308, the web controller 104 extracts the user token from the memory area and stores the user token in the database 101.

Figure 4:
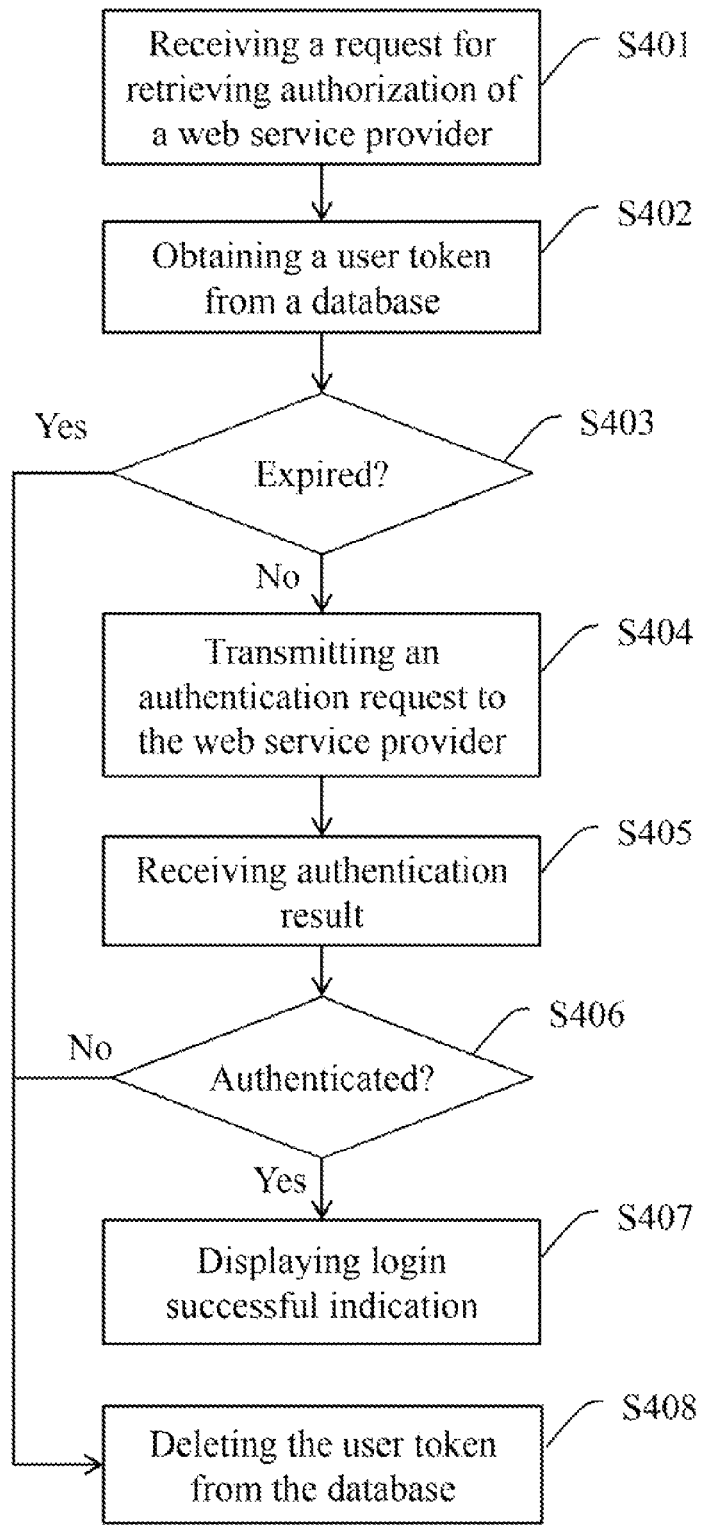
FIG. 4 is an operational flow diagram representing an exemplary embodiment of a method for retrieving authorization of a web service provider using the token management system of FIG. 1.

FIG. 4 is a flowchart illustrating one embodiment of a method of retrieving authorization of a web service provider. The method may include the following blocks.

In block S401, the obtaining module 102 receives a retrieving request for retrieving authorization of a web service provider 20 on the network 30.

In block S402, the obtaining module 102 obtains a user token from the database 101.

In block S403, the determining module 103 determines whether the user token has expired according to the expiration time of that user token. If the user token has expired, the flow goes to block S408. If the user token has not expired, the flow goes to block S404.

In block S404, the web controller 104 transmits an authenticating request for authenticating the user token to the web service provider 20.

In block S405, the web controller 104 receives an authentication result authenticating the user token from the web service provider 20.

In block S406, if the user token is not authenticated, the flow goes to block S408. If the web service provider 20 authenticates the user token, the flow goes to block S407.

In block S407, the processing module 105 displays a login successful indication to inform that the user is authorized to access to the web service.

In block S408, the processing 105 deletes the user token from the database 101.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. It is also to be understood that the description and the claims drawn relating to a method may include some indication in reference to certain steps. However, the indication used is only to be viewed for identification purposes and not taken as a suggestion as to an order for the steps.

What is claimed is:

1. A method of managing user token in a client device on a network, comprising:
   providing a database in the client device;
   storing at least one user token in the data base, each of the at least one user token being associated with a web service provider in communication with the client device through the network;
   retrieving a user token of the at least one user token from the database in response to a retrieving request for retrieving authorization of a web service provider on the network;
   transmitting an authenticating request for authenticating the user token to the web service provider;
   receiving an authentication result authenticating the user token from the web service provider; and
   deleting the user token from the database when the user token is not authenticated according to the authentication result.

2. The method of claim 1, wherein the storing the at least one user token in the database further comprises:
   invoking a web browser;
   obtaining the user token from the service provider by the web browser; and
   storing the user token, obtained from the service provider, in the database.

3. The method of claim 2, wherein the obtaining the user token from the service provider further comprises:
   transmitting a page request to the web service provider;
   receiving a page from the web service provider;
   displaying the page for input user unique information in the web browser;
   transmitting the user-unique information of a user to the web service provider; and
   receiving, from the web service provider, the user token in association with the user-unique information.

4. The method of claim 3, wherein the user-unique information comprises a user name and a password.

5. The method of claim 3, wherein the user token, received from the web service provider, is stored in a memory area associated with the client device.

6. The method of claim 5, wherein the memory area comprises a cookie.

7. The method of claim 1, further comprising displaying a login successful indication when the user token is authenticated according to the authentication result.

8. The method of claim 1, wherein each of the at least one user token stored in the database is associated with an expiration time.

9. The method of claim 8, further comprising:
   determining whether the user token, retrieved from the database, has expired according to the expiration time of the user token;
   deleting the user token from the database, when the use token is determined to be expired.

10. An electronic device, comprising:
    a storage system;
    at least one processor;

one or more programs being stored in the storage system and executable by the at least one processor, the one or more programs comprising:

a database adapted to store at least one user token, each of the at least one user token being associated with a web service provider in communication with the electronic device;

an obtaining module adapted to retrieve a user token of the at least one user token from the database in response to a retrieving request for retrieving authorization of a web service provider on a network;

a web controller adapted to transmit an authenticating request for authenticating the user token to the web service provider and receive an authentication result authenticating the user token from the web service provider; and a processing module adapted to delete the user token from the database when the user token is not authenticated according to the authentication result.

11. The electronic device of claim 10, wherein the web controller is further adapted to invoke a web browser, and instruct the web browser to obtain the user token from the web service provider.

12. The electronic device of claim 11, wherein the web controller is further adapted to store the token, retrieved from the web service provider, in the database.

13. The electronic device of claim 11, wherein the web controller is further adapted to control the web browser to transmit a page request to the web service provider, and receive and display the page for input user-unique information in the web browser.

14. The electronic device of claim 13, wherein the web controller is further adapted to control the web browser to transmit the user-unique information to the web service provider; and receive, from the web service provider, the user token in association with the user-unique information.

15. The electronic device of claim 14, wherein the user token is stored in a memory area associated with the electronic device.

16. The electronic device of claim 15, wherein the memory area comprises a cookie.

17. The electronic device of claim 13, wherein the user-unique information comprises a user name and a password.

18. The electronic device of claim 10, wherein the processing module is further adapted to display a login successful indication when the user token is authenticated according to the authentication result.

19. The electronic device of claim 10, wherein each of the at least one user token stored in the database is associated with an expiration time.

20. The electronic device of claim 19, further comprising a determining module adapted to determine whether the user token has expired according to the expiration time of the user token and delete the user token from the database when the user token expires.

* * * * *